(12) United States Patent
Lee et al.

(10) Patent No.: US 8,663,801 B1
(45) Date of Patent: Mar. 4, 2014

(54) ORGANIC-INORGANIC NANOCOMPOSITE AND POLYMER RESIN COMPRISING THE SAME

(71) Applicant: Korea Institute of Ceramic Engineering and Technology, Seoul (KR)

(72) Inventors: Dong Jin Lee, Seoul (KR); Hyung Mi Lim, Gunpo-si (KR); Young Hee Kim, Seoul (KR); Su Jin Cha, Seoul (KR)

(73) Assignee: Korea Institute of Ceramic Engineering and Technology, Seoul (KR)

( * ) Notice: Subject to any disclaimer, the term of this patent is extended or adjusted under 35 U.S.C. 154(b) by 0 days.

(21) Appl. No.: 13/675,512

(22) Filed: Nov. 13, 2012

(30) Foreign Application Priority Data

Nov. 2, 2012 (KR) .......................... 10-2012-0123818

(51) Int. Cl.
*B32B 5/16* (2006.01)
*C01G 23/047* (2006.01)
*B01J 27/24* (2006.01)

(52) U.S. Cl.
USPC ............ 428/402; 423/610; 977/773; 502/200

(58) Field of Classification Search
USPC ............ 428/402; 423/610; 977/773; 502/200
See application file for complete search history.

(56) References Cited

FOREIGN PATENT DOCUMENTS

WO     WO 2010/020812    *   2/2010

* cited by examiner

*Primary Examiner* — William Cheung
(74) *Attorney, Agent, or Firm* — Sherr & Jiang, PLLC

(57) ABSTRACT

The present invention relates to an organic-inorganic nanocomposite having orientation and a polymer resin comprising the same. An organic-inorganic nanocomposite according to the present invention includes inorganic nanoparticles each having one or more hydrogen bondable functional groups; first organic compounds each having two or more hydrogen bondable functional groups and one or more aromatic groups; and second organic compounds each having one or more hydrogen bondable functional groups and one or more aromatic groups, wherein the inorganic nanoparticle, the first organic compound and the second organic compound are bonded sequentially through hydrogen bonds, and the hydrogen-bonded inorganic nanoparticle, first organic compound and second organic compound, are laminated through $\pi$-$\pi$ interaction to have orientation.

14 Claims, 6 Drawing Sheets

ORGANIC-INORGANIC NANOCOMPOSITE AND POLYMER RESIN COMPRISING THE SAME

CROSS REFERENCE TO PRIOR APPLICATIONS

The present application claims priority under 35 U.S.C. §119 to Korean Patent Application No. 10-2012-0123818 (filed on Nov. 2, 2012), which is hereby incorporated by reference in its entirety.

BACKGROUND OF THE INVENTION

1. Field of the Invention

The present invention relates to an organic-inorganic nanocomposite having orientation, which is a hybrid composite material having excellent flexibility and mechanical strength, and a polymer resin comprising the same.

2. Description of the Related Art

An abalone shell has received much attention in the field of material for car, airplane, artificial satellite and the like due to its rigid and light-weight properties. It has been known that the abalone shell structure is composed of a brick-mortar nanostructure having orientation. Specifically, it was reported that the abalone shell having an organic-inorganic composite structure having an organic material existing between mineral layers shows excellent mechanical properties [R. Chen, C. Wang, Y. Huang, H. Le, An efficient biomimetic process for fabrication of artificial nacre with ordered-nanostructure, Mat. Sci. Eng C 28 (2008) 218-222].

Therefore, many studies for developing new materials imitating the abalone shell structure have progressed, but no material having satisfactory performance was developed yet.

In the meantime, a polymer resin is being used variously as an industrial material for vehicle parts and the like, and in order to improve mechanical properties, flame resistance, heat resistance, impact resistance and the like of the polymer resin, an inorganic reinforcing agent such as talc, mica and $CaCO_3$ is being used.

However, there has been a problem in that a conventional inorganic reinforcing agent should be used in large quantity because its effect on improving the mechanical properties of the polymer resin such as flexural strength is not high enough.

SUMMARY OF THE INVENTION

The present inventors have intensively studied to develop an organic-inorganic nanocomposite having orientation, and as a result, the present invention has been completed by founding that when organic compounds having aromatic groups are bonded to inorganic nanoparticles through hydrogen bonds, orientation can be obtained by the lamination of the inorganic nanoparticles through π-π interaction between the aromatic groups existing in the organic compounds.

Therefore, it is an object of the present invention to provide an organic-inorganic nanocomposite having orientation.

It is another object of the present invention to provide a method for manufacturing an organic-inorganic nanocomposite having orientation.

It is a further object of the present invention to provide a polymer resin comprising the organic-inorganic nanocomposite and having excellent flexural strength.

It is a still further object of the present invention to provide a method for manufacturing a polymer resin comprising the organic-inorganic nanocomposite.

DESCRIPTION OF THE PREFERRED EMBODIMENT

Figure 1:
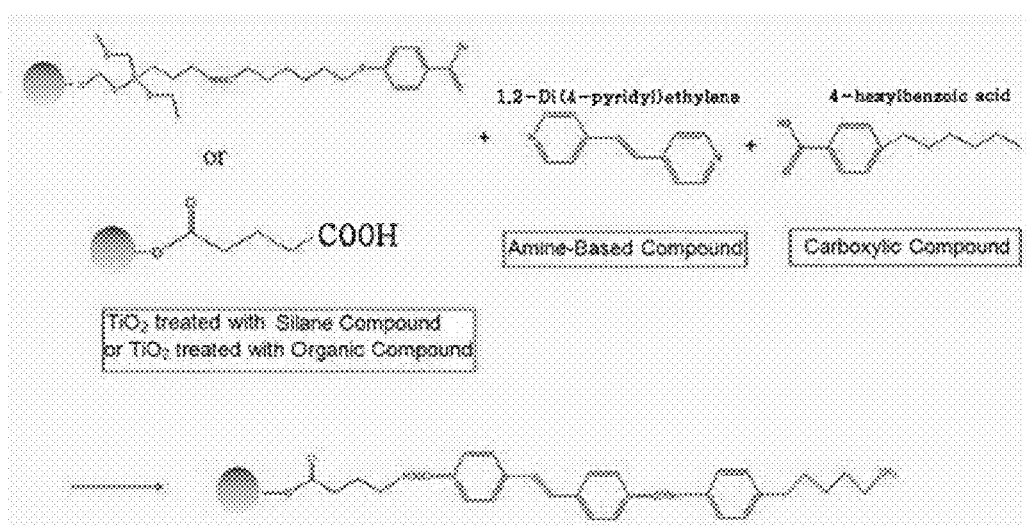
FIG. 1 is a view showing a state that an inorganic nanoparticle ($TiO_2$ treated with a silane compound or an organic compound), a first organic compound (DPE) and a second organic compound (HBA) are bonded sequentially through hydrogen bonds in an organic-inorganic nanocomposite according to one embodiment of the present invention.

The present invention relates to an organic-inorganic nanocomposite, which includes inorganic nanoparticles each having one or more hydrogen bondable functional groups; first organic compounds each having two or more hydrogen bondable functional groups and one or more aromatic groups; and second organic compounds each having one or more hydrogen bondable functional groups and one or more aromatic groups, wherein the inorganic nanoparticle, the first organic compound and the second organic compound are bonded sequentially through hydrogen bonds, and the hydrogen-bonded inorganic nanoparticle, first organic compound and second organic compound, are laminated through π-π interaction to have orientation.

In order that the inorganic nanoparticle, the first organic compound and the second organic compound are bonded sequentially through hydrogen bonds, in the hydrogen bondable functional groups of the compounds and/or nanoparticle to be hydrogen-bonded, if one hydrogen bondable functional group is a proton donor, another hydrogen bondable functional group is a proton acceptor. For example, if one of the hydrogen bondable functional groups of the inorganic nanoparticle is a proton donor, one of the hydrogen bondable functional groups of the first organic compound may be a proton acceptor. Also, if one of the hydrogen bondable functional groups of the inorganic nanoparticle is a proton acceptor, one of the hydrogen bondable functional groups of the first organic compound may be a proton donor.

The proton acceptor may be an atom having high electronegativity such as nitrogen, oxygen, sulfur, fluorine and chlorine, and the proton donor may be a functional group such as an amino group, a hydroxyl group, a carboxyl group, a thiol group, a hydrofluoric group and a hydrochloric group.

The kind of the inorganic nanoparticle is not particularly limited, but for example, one or more selected from the group consisting of: oxides such as silica ($SiO_2$), alumina ($Al_2O_3$), titania ($TiO_2$), zirconia ($ZrO_2$), tin oxide ($SnO_2$) and zinc oxide (ZnO); carbides such as titanium carbide (TiC), silicon carbide (SiC) and beryllium carbide ($Be_2C$); nitrides such as titanium nitride (TiN) and boron nitride (BN); hydroxides such as magnesium hydroxide (Mg(OH)$_2$) and aluminum hydroxide (Al(OH)$_3$); and calcium carbonate (CaCO$_3$) may be used, and preferably titania may be used.

The inorganic nanoparticle may have a particle diameter of 10 nm to 1 μm. In this particle diameter range, the inorganic nanoparticles are not aggregated but have excellent orientation.

The inorganic nanoparticle may be in the shape of a sphere, needle or rod, and the needle-shaped inorganic nanoparticle is preferred.

In the present invention, as the inorganic nanoparticle having one or more hydrogen bondable functional groups, the inorganic nanoparticle itself, or the inorganic nanoparticle modified with a silane compound and/or an organic compound may be used. Generally, because a hydroxyl group exists on the surface of the inorganic nanoparticle, the inorganic nanoparticle itself may be used, or extra hydrogen bondable functional groups may be introduced into the particle using a silane compound and/or an organic compound.

In this case, the silane compound may comprise one or more selected from the group consisting of: aminosilanes such as 4-aminobutyl methyl diethoxysilane, 3-amminopropyl trimethoxysilane, 3-amminopropyl triethoxysilane and N-2-aminoethyl-3-amminopropyl diethyl isopropoxysilane; mercaptosilanes such as (mercaptomethyl)dimethyl ethoxysilane, di-(4-mercaptobutyl)dimethoxysilane and 3-mercaptopropyl triisopropoxysilane; acrylosilanes such as 3-methacryloxypropyl dimethyl ethoxysilane, 3-(methacryloxy)propyl trimethoxysilane and 3-acryloxypropyl trimethoxysilane; epoxysilanes such as (3-glycidyloxypropyl) methyl dimethoxysilane and 2-(3,4-epoxycyclohexyl)ethyl trimethoxysilane; haloalkyl silanes such as 3-chloropropyl trimethoxysilane, 4-bromobutyl methyl dibutoxysilane and 5-iodohexyldiethylmethoxysilane; iso(thio)cyanate silanes such as 3-isocyanate propyl trimethoxysilane and 3-isothiocyanate propyl methyl dimethoxysilane; hydroxyl silanes such as 3-hydroxybutyl isopropyl dimethoxysilane and bis(2-hydroxyethyl)-3-amminopropyl triethoxysilane; haloaryl silanes such as bromophenyl trimethoxysilane and (2-(iodophenyl)ethyl)ethyl dimethoxysilane; haloalkyl aryl silanes such as bis(chloromethyl phenyl)dimethoxysilane and bromomethyl phenyl dimethyl isopropoxysilane; carbodiimide silanes such as bis(propyl trimethoxysilane)carbodiimide and N-ethyl-N-(propyl ethoxydimethoxysilane)-carbodiimide; and 3-(trimethoxysilyl)propanol, (3,5-hexadione)triethoxysilane, 3-(trimethoxysilyl)propyl acetoacetate, 3-ureidopropyl trimethoxysilane, N-ethoxycarbonyl-3-amminopropyl trimethoxysilane, N-triethoxysilyl propyl triethylene triamine, N-trimethoxysilyl propyl triethylene triamine, 10-trimethoxysilyl-1,4,7-triazodecan, 10-triethoxysilyl-1,4,7-triazodecan, 9-trimethoxysilyl-3,6-azononyl acetate, 3-(triethoxysilyl)propyl succinic anhydride, N-benzyl-3-amminopropyl trimethoxysilane, N-phenyl-3-amminopropyl trimethoxysilane and N-bis-oxyethylene-3-amminopropyl trimethoxysilane.

Specifically, in the present invention, the silane compound may comprise one or more selected from the group consisting of 3-(triethoxysilyl)propyl succinic anhydride, 3-(methacryloxy)propyl trimethoxysilane, and 3-amminopropyl triethoxysilane.

For example, one or more functional groups selected from the group consisting of hydroxyl, amine, urea, acid anhydride, acetacetoxy, aldehyde, carboxylic acid, ester and mercaptan may be formed on the surface of the inorganic nanoparticle modified with the silane.

The inorganic nanoparticle modified with the silane compound further reacted with an organic compound may be used in the present invention. For example, if the terminal group of the inorganic nanoparticle modified with the silane compound is hydroxy, amine, urea or acid anhydride, a compound comprising isocyanate or isothiocyanate may be used as the organic compound; if the terminal group of the inorganic nanoparticle is acetacetoxy or amine, a compound comprising aldehyde may be used as the organic compound; and if the terminal group of the inorganic nanoparticle is aldehyde or amine, a compound comprising acetacetoxy may be used as the organic compound. Further, if the terminal group of the inorganic nanoparticle is hydroxy, carboxylic acid, acid anhydride, amine or mercaptan, a compound comprising epoxide, thiolane or aziridine may be used as the organic compound; if the terminal group of the inorganic nanoparticle is carboxylic acid, hydroxy, amine or mercaptan, a compound comprising carbodiimide may be used as the organic compound; if the terminal group of the inorganic nanoparticle is amine or carboxylic acid, a compound comprising haloalkyl as the organic compound; if the terminal group of the inorganic nanoparticle is halomethyl phenyl, a compound comprising amine or mercaptan may be used as the organic compound; and if the terminal group of the inorganic nanoparticle is epoxide, aziridine, thiolane, amine, ester or carbodiimide, a compound comprising carboxylic acid may be used as the organic compound.

Further, in the present invention, the inorganic nanoparticle may be directly reacted with an organic compound to form a functional group on the surface of the nanoparticle rather than modifying the nanoparticle with the silane compound.

Specifically, as the organic compound, compounds comprising a —CONH group, an amine group, a hydroxyl group, an alkoxy group or a carboxyl group in the molecule may be used, and the compounds may be used in combination.

The compound having the —CONH group may be one or more selected from the group consisting of: acrylamides such as N-alkyl acryl amide, N,N-dialkyl acryl amide and acrylamide; and methacryl amides such as N-alkyl methacryl amide, N,N-dialkyl methacryl amide and methacryl amide.

The compound having the amine group may be a diamine compound, for example, one or more selected from the group consisting of 4,4-diaminodiphenylmethane, 3,4-diaminodiphenylmethane, 3,3-diaminodiphenylmethane, 3,3-dimethyl-4,4-diaminodiphenylmethane, 4,4-diaminodiphenylether, 4,4-diaminodiphenylsulfide, 3,4-diaminodiphenylsulfide, 3,3-diaminodiphenylsulfide, 3,3-dimethyl-4,4-diaminodiphenylsulfide, 2,2-bis[4-(4-aminophenoxy)phenyl]propane and 2,2-bis[4-(3-aminophenoxy)phenyl]propane. The compound having the amine group may also be aromatic diamines such as p-phenylene diamine, m-phenylene diamine, 4,4-diaminodiphenyl ethane, 4,4-diaminodiphenyl sulfone, 1,5-diaminonaphthalene, 3,3-dimethyl-4,4-diaminobisphenyl, 4,4-diaminobenzanilide, 3,4-diaminodiphenylether, 3,3-diaminobenzophenone, 3,4-diaminobenzophenone, 4,4-diaminobenzophenone, 2,2-bis[4-(aminophenoxy)phenyl] sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,9-bis(4-aminophenyl)fluorene, 4,4-methylene-bis(2-chloro)aniline, 2,2,5,5-tetrachloro-4,4-diaminobiphenyl, 2,2-di chloro-4,4-diamino-5,5-dimethoxybiphenyl and 3,3-dimethoxy-4,4-diaminobiphenyl; aromatic diamines having a hetero atom such as diaminotetraphenyl thiophene; and metaxylene diamine, 1,3-propanediamine, tetramethylene diamine, pentamethylene diamine, hexamethylene diamine, heptamethylene diamine, octamethylene diamine, nonamethylene diamine, 4,4-diaminoheptamethylenediamine, 1,4-diaminocyclohexane, and the like.

The compound having the hydroxyl group may be one or more hydroxymethacrylates selected from the group consisting of hydroxyethyl methacrylate, hydroxypropyl methacrylate and hydroxybutyl methacrylate, and it also may be a phenyl compound comprising a hydroxyl group such as 2-trifluoromethyl phenol, 3-trifluoromethyl phenol, 4-trifluoromethyl phenol, 2-trifluormethoxyphenol, 3-trifluormethoxyphenol, 4-trifluormethoxyphenol, 4-pentafluoroethylphenol, 4-heptafluoro propyl phenol, 4-pentafluoroethoxyphenol, 4-heptafluoropropoxyphenol, 2,4-trifluoromethyl phenol, 2,5-trifluoromethyl phenol, 3,4-trifluoromethyl phenol, 3,5-trifluoromethyl phenol, 2,4-trifluormethoxyphenol, 2,5-trifluormethoxyphenol, 3,4-trifluormethoxyphenol, 3,5-trifluormethoxyphenol, 2,3,4-tri(trifluoro)methyl phenol, 2,4,6-tri(trifluoro)methyl phenol, 2,4,5-tri(trifluoro)methyl phenol, 3,4,5-tri(trifluoro)methyl phenol, 2,3,4-tri(trifluoro)methoxyphenol, 2,4,6-tri(trifluoro)methoxyphenol, 2,4,5-tri(trifluoro)methoxyphenol and 3,4,5-tri(trifluoro)methoxyphenol.

The compound having the alkoxy group may be one or more allkoxymethacrylates selected from the group consisting of methoxyethyl methacrylate and ethoxyethyl methacrylate.

Further, the compound having the carboxyl group may be a compound prepared by reacting an acyl halide compound, a phenyl compound having a hydroxyl group and the like. In this case, the acyl halide compound may comprise chloride, and specifically, it may be one or more selected from the group consisting of 2,4-nitrobenzoic acid chloride, 2,6-nitrobenzoic acid chloride, 3,4-nitrobenzoic acid chloride, 3,5-nitrobenzoic acid chloride, 5,5-methylene-bis2-nitrobenzoic acid chloride, 4,4-nitrophenylether-3,3-dicarboxylic acid chloride and 4,4-nitrobiphenyl-3,3-dicarboxylic acid chloride, and the phenyl compound having a hydroxyl group may be the same compounds as described above.

In the present invention, the first organic compound has two or more hydrogen bondable functional groups in order to form hydrogen bonds with the inorganic nanoparticle and the second organic compound, and the second organic compound has one or more hydrogen bondable functional groups in order to form a hydrogen bond with the first organic compound.

In addition, each of the first organic compound and the second organic compound has one or more aromatic groups, and the aromatic group enables the hydrogen-bonded inorganic nanoparticle, first organic compound and second organic compound, to be laminated through π-π interaction.

In the present invention, the aromatic group may include a heteroaromatic group comprising one or more of nitrogen, oxygen and sulfur, and an example of the aromatic group may be phenyl, naphthyl, pyridinyl, furanyl, thiophenyl, indolyl, quinolinyl, imidazolinyl, oxazolyl, thiazolyl, tetrahydronaphthyl and the like, but not limited thereto.

As one embodiment of the present invention, the first organic compound may be a compound having two or more heteroaromatic groups comprising one or more of nitrogen, oxygen and sulfur. Specifically, the first organic compound may be a compound having two or more heteroaromatic groups selected from the group consisting of a heteroaromatic group comprising nitrogen such as pyrrole, pyridine and azepine; a heteroaromatic group comprising oxygen such as furan, pyran and osepine; and a heteroaromatic group comprising sulfur such as thiophene, thiopyran and thiepine.

In this case, oxygen, sulfur or nitrogen existing on the heteroaromatic group of the first organic compound may act as a hydrogen bondable functional group (proton acceptor).

On the other hand, the second organic compound may be an aromatic compound having an amino group, a hydroxyl group or a carboxyl group. Specifically, the second organic compound may be a benzoic acid substituted with an alkyl group or an alkoxy group.

In this case, the amino group, hydroxyl group or carboxyl group in the second organic compound may act as a hydrogen bondable functional group (proton donor).

As another embodiment of the present invention, the inorganic nanoparticle may be titania ($TiO_2$), the first organic compound may be 1,2-di(4-pyridyl)ethylene (DPE) of the following Formula (I), and the second organic compound may be 4-hexyl benzoic acid (HBA) of the following Formula (II).

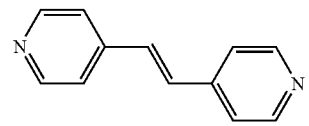

Formula (I)

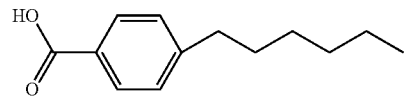

Formula (II)

In the meantime, the present invention relates to a manufacturing method of an organic-inorganic nanocomposite according to the present invention. The manufacturing method of the present invention comprises the steps of:

(i) mixing first organic compounds each having two or more hydrogen bondable functional groups and one or more aromatic groups; and second organic compounds each having one or more hydrogen bondable functional groups and one or more aromatic groups in an organic solvent;

(ii) adding inorganic nanoparticles each having one or more hydrogen bondable functional groups to the resulting mixture and mixing them; and (iii) evaporating the organic solvent to remove it.

The inorganic nanoparticle, the first organic compound and the second organic compound are as described above, and they may be commercial products or may be prepared easily according to well-known methods in the art.

In the step (i), it is preferred that a molar ratio of the first organic compounds to the second organic compounds is 1:0.1 to 1:10. The organic-inorganic nanocomposite prepared within the above range has excellent orientation.

The organic solvent may be acetone, methanol, ethanol, methyl ethyl ketone (MEK) and the like, but not limited thereto.

In the step (ii), it is preferred that the inorganic nanoparticles may be used in an amount of 4 to 100 parts by weight based on 100 parts by weight of the mixture of the first organic compounds and the second organic compounds. The organic-inorganic nanocomposite prepared within the above range has excellent orientation.

Figure 2:
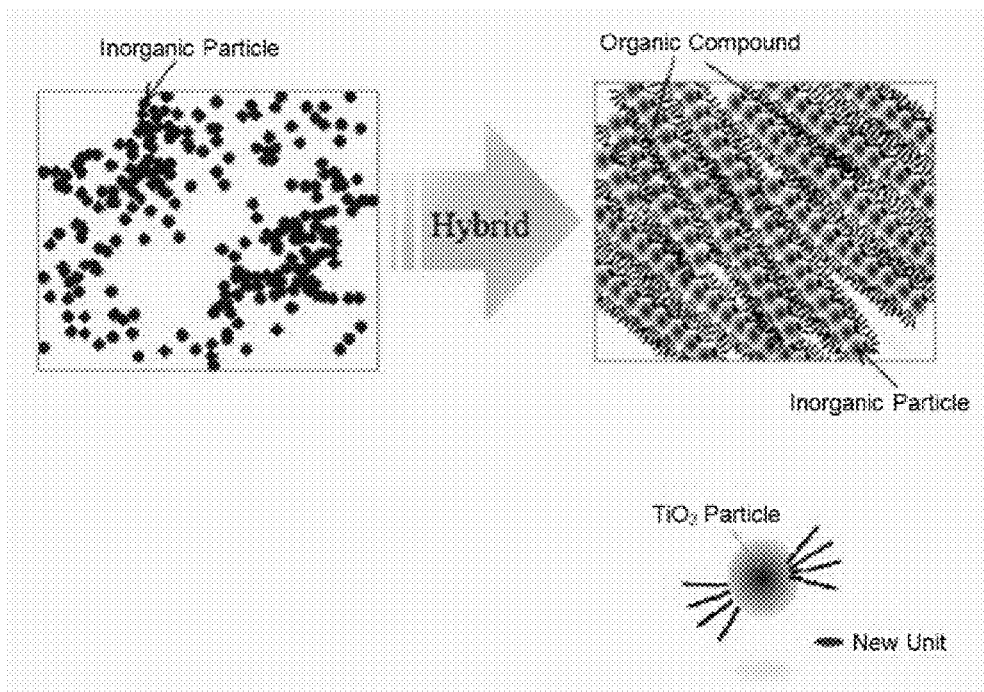
FIG. 2 is a view showing that the organic-inorganic nanocomposite has orientation by laminating the hydrogen-bonded inorganic nanoparticle, first organic compound and second organic compound as shown in FIG. 1, through π-π interaction.

In one embodiment of the present invention, the inorganic nanoparticle ($TiO_2$ treated with a silane compound or an organic compound), the first organic compound (DPE) and the second organic compound (HBA) are united to one another sequentially through hydrogen bonds (see FIG. 1), and the hydrogen-bonded inorganic nanoparticle, first organic compound and second organic compound, are laminated through π-π interaction (see FIG. 2). As a result, the organic-inorganic nanocomposite according to the present invention has orientation.

The organic-inorganic nanocomposite according to the present invention may be used as an inorganic reinforcing agent to reinforce properties of a polymer resin. Accordingly, on the other hand, the present invention relates to a polymer resin comprising the organic-inorganic nanocomposite according to the present invention.

In the present invention, the kind of the polymer resin is not particularly limited, and it may be any of thermoplastic resins and thermosetting resins. For example, the thermoplastic resin may be one or more selected from the group consisting of a polyvinyl chloride resin, a polystyrene resin, a polyethylene resin, a polypropylene resin, an acryl resin and nylon. The thermosetting resin may be one or more selected from the group consisting of a phenol resin, a urea resin, a melamine resin, an epoxy resin, unsaturated polyester, an alkyd resin and a urethane resin.

In the present invention, the organic-inorganic nanocomposite may be used in an amount of 5 to 50 parts by weight, preferably 10 to 40 parts by weight based on 100 parts by weight of the polymer resin. Within the above range, affinity of the nanocomposite to the polymer becomes better, and as a result, mechanical properties such strength and heat-resistance of the polymer resin, particularly, flexural strength can be significantly improved.

As necessary, the polymer resin according to the present invention may further comprise a nucleating agent, a heat stabilizer, an antistatic agent, a UV stabilizer and the like to improve rigidity, weatherablity, heat resistance, releasability, antistatic property and the like.

The polymer resin comprising the organic-inorganic nanocomposite according to the present invention may have a flexural strength of 30 MPa to 35 MPa in 2 mm thickness according to ASTM D790. Within the above range, the polymer resin has the most preferable stretch property and flexural property.

In the meantime, the present invention relates to manufacturing method of a polymer resin comprising the organic-inorganic nanocomposite according to the present invention. The method comprises the steps of:

(a) mixing the organic-inorganic nanocomposite and the polymer resin according to the present invention; and (b) curing the resulting mixture.

In the step (a), the organic-inorganic nanocomposite according to the present invention may be used in an amount of 5 to 50 parts by weight based on 100 parts by weight of the polymer resin.

In the step (b), the curing method is not particularly limited, but a suitable method can be selected and used according to the kind of the polymer resin. For example, in case of the thermoplastic resin, the curing can be performed by maintaining the mixture at 60° C. to 200° C. for 5 min to 5 hours, or by a stepwise curing process via two or more steps at suitable temperature for a suitable time.

The manufacturing method according to the present invention may further comprise the step of pelletizing the mixture between the mixing step (a) and the curing step (b). The step of pelletizing is not particularly limited, but may be performed using a general extruder into a pellet form.

Further, the method may further comprise the step of cooling the cured product after the curing step (b). The cooling condition is not particularly limited, but for example, can be cooled at 10 to 20° C. for 5 to 20 min.

The organic-inorganic nanocomposite according to the present invention has orientation even in the polymer resin. As a result, affinity of the nanocomposite to the polymer resin is improved, and a stretch property and a flexural property (flexural strength) of the polymer resin become better.

The organic-inorganic nanocomposite according to the present invention has better flexibility and mechanical strength than a polymer resin comprising a conventional inorganic nanoparticle. Accordingly, the organic-inorganic nanocomposite according to the present invention is a high strength and lightweight composite material, and it can be used as interior/exterior materials of vehicles, ships, airplanes, energy-efficient buildings and the like. In addition, the organic-inorganic nanocomposite according to the present invention can be used for strengthening mechanical properties of the polymer resin, particularly flexural strength.

Hereinafter, the following Examples are intended to further illustrate the present invention. These Examples are only intended to describe the present invention, and thus, it is obvious to those skilled in the art that the scope of the present invention is not limited to these Examples.

Preparation Example 1

Preparation of Inorganic Nanoparticle

Anatase $TiO_2$ powder 2 g was mixed with 10 M NaOH solution 70 ml, and the mixture was hydrothermally treated in a Teflon-treated autoclave at 150° C. for 24 hours. Then, the sample was filtered and neutralized by washing it several times with 0.1 M HCl solution 1 L until pH of the washing solution becomes less than 7. The produced powder was dried at 60° C. for 24 hours to obtain a nanotube-shaped $TiO_2$ nanoparticle (External diameter: 10~15 nm, Length: several hundred nanometers). The obtained nanoparticle was calcined under air atmosphere in an oven at 500° C. for 6 hours to obtain a nanorod-shaped $TiO_2$ nanoparticle (Diameter: 10 nm, Length: 20~50 nm).

Figure 3:
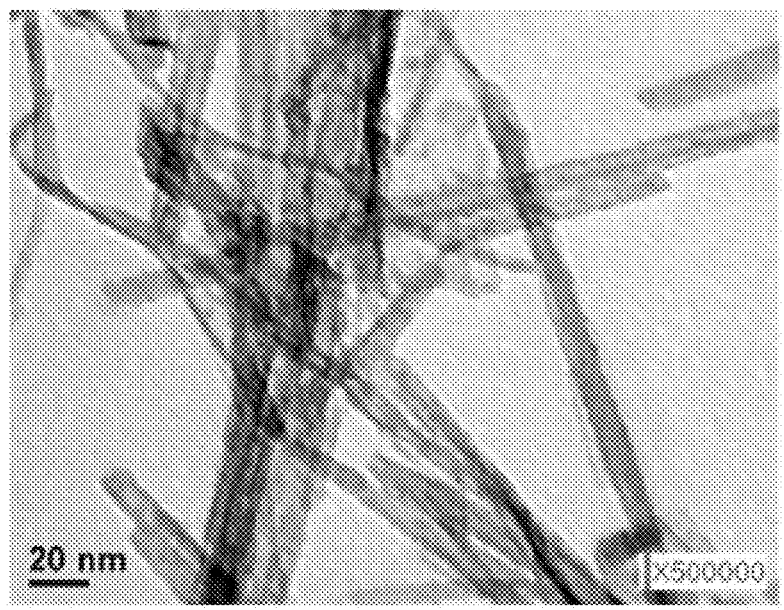
FIG. 3 is an image of a transmission election microscope of nanotube-shaped $TiO_2$ nanoparticles obtained in Preparation Example 1.
Figure 4:
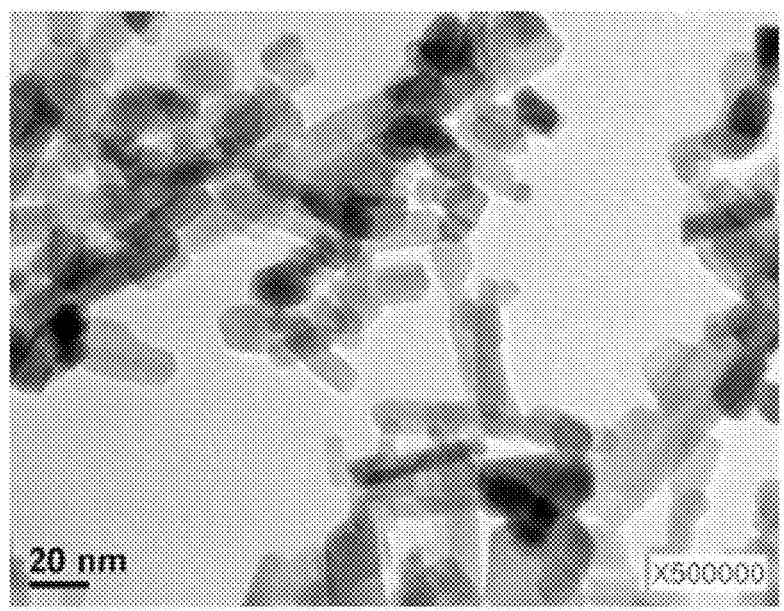
FIG. 4 is an image of a transmission election microscope of nanorod-shaped $TiO_2$ nanoparticles obtained in Preparation Example 1.

Images of transmission election microscope (TEM) of the obtained nanotube-shaped $TiO_2$ nanoparticle and the obtained nanorod-shaped $TiO_2$ nanoparticle are shown in FIGS. 3 and 4, respectively.

Examples 1-9

Preparation of Organic-Inorganic Nanocomposite 1,2-di(4-pyridyl)ethylene (DPE) and 4-hexylbenzoic acid (HBA) were added to acetone 30 ml in an amount listed in Table 1, respectively, and the solution was stirred at room temperature for 24 hours. The nanorod-shaped $TiO_2$ nanoparticle prepared in Preparation Example 1, a sphere-shaped $TiO_2$ nanoparticle (ST-21, Ishihara) and a needle-shaped $TiO_2$ nanoparticle (Nanoamor, Nanogetters) were added to the resulting solution in an amount listed in the following Table 1, respectively, and stirred at room temperature for 24 hours. Then, the solvent was removed by evaporation at 50° C., and a residue was dried in an oven at 70° C. to obtain an organic-inorganic nanocomposite.

TABLE 1

| Classification | Shape of $TiO_2$ | $TiO_2$ (g) | HBA (g) | DPE (g) |
|---|---|---|---|---|
| Example 1 | Sphere | 0.179 | 0.179 | 0.91 |
| Example 2 | Needle | | | |
| Example 3 | Rod | | | |

TABLE 1-continued

| Classification | Shape of TiO$_2$ | TiO$_2$ (g) | HBA (g) | DPE (g) |
|---|---|---|---|---|
| Example 4 | Sphere | 0.119 | 0.238 | 0.91 |
| Example 5 | Needle | | | |
| Example 6 | Rod | | | |
| Example 7 | Sphere | 0.072 | 0.286 | 0.91 |
| Example 8 | Needle | | | |
| Example 9 | Rod | | | |

Figure 5:
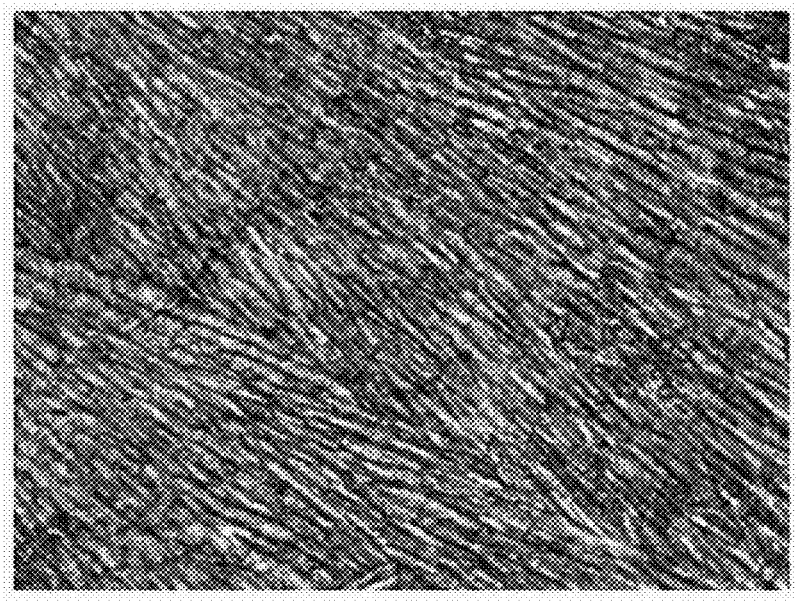
FIG. 5 is an image of a polarized optical microscope of an organic-inorganic nanocomposite obtained in Example 5.

An image of a polarized optical microscope (POM, ECLIPSE LV100, Nikon) of the organic-inorganic nanocomposite obtained in Example 5 is shown in FIG. 5. As shown in FIG. 5, the organic-inorganic nanocomposite according to the present invention shows regular orientation.

Figure 6:
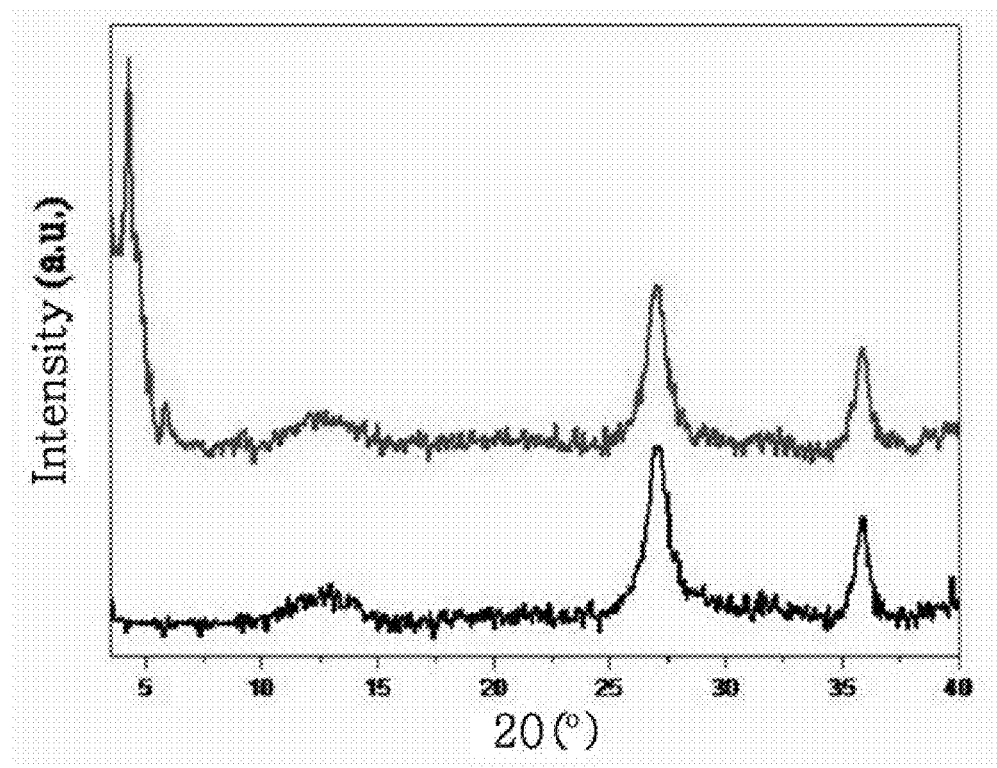
FIG. 6 is an XRD graph of the organic-inorganic nanocomposite obtained in Example 5.

Further, a continuous XRD (one-dimensional wide-angle X-ray diffraction: WAXD, D/MAX-2500, RIGAKU) analysis of the organic-inorganic nanocomposite obtained in Example 5 was conducted in a range of 1 to 40° at a scan rate of 2°/min, and the result is shown in FIG. 6. As shown in FIG. 6, the organic-inorganic nanocomposite according to the present invention shows a strong peak at an angle of 5° or less, which means that the organic-inorganic nanocomposite has a structure having orientation.

Comparative Example 1

Preparation of Inorganic Nanoparticle

Φ0.1 zirconia bead 1 kg, TiO$_2$ nanoparticles 10 g and anhydrous ethanol as a solvent 180 g were added into a 1 L beaker, and subjected to sand milling after installing a disk to a machine to prepare an inorganic nanoparticle.

Example 10

Preparation of Polymer Resin Comprising Organic-Inorganic Nanocomposite

Polypropylene (PP; CB5230, Korea Petrochemical Ind. Co., Ltd) as a polymer resin and the organic-inorganic nanocomposite obtained in Example 5 were dried at 80° C. for 24 hours, respectively.

The dried polypropylene resin 25 g was kneaded using a melt compounder (Plastograph, Brabender®) at 200° C. for 5 min, and then the dried organic-inorganic nanocomposite 2.5 g was added thereto followed by mixing for 5 min. The mixture was put into a mold and pressed at 10 MPa and 200° C. for 5 min followed by cooling for 5 min to prepare a polymer resin comprising the organic-inorganic nanocomposite.

Comparative Example 2

Preparation of Polymer Resin Comprising Inorganic Nanoparticle

A polymer resin comprising the inorganic nanoparticle by the method of Example 10 except for using the inorganic nanoparticle obtained in Comparative Example 1 instead of the organic-inorganic nanocomposite obtained in Example 5.

Test Example 1

Measurement of Flexural Strength

The polymer resins obtained in Example 10 and Comparative Example 2 were cut into a size of 50 mm×5 mm×2 mm, respectively, and flexural strength was measured using a universal tester (5544 universal tester INSTRON®). Support span was 30 mm, and a load was added at room temperature and a rate of 0.5 ml/min. Measurement was repeated to each of the five samples.

Averages of the measured flexural strength of five samples were listed in the following Table 2, respectively.

TABLE 2

| Classification | Sample | Flexural Strength (MPa) |
|---|---|---|
| Example 1 | TiO$_2$ nanocomposite/PP | 32.3 |
| Comparative Example 2 | TiO$_2$ nanoparticle/PP | 28.4 |

As shown in Table 2, while the flexural strength of the polymer resin comprising the conventional inorganic nanoparticle was 28.4 MPa, the flexural strength of the polymer resin comprising the organic-inorganic nanocomposite according to the present invention was 32.3 MPa. Therefore, it was confirmed that the organic-inorganic nanocomposite according to the present invention had better effect on improving physical properties of the polymer resin.

Test Example 2

SEM Analysis

Figure 7:
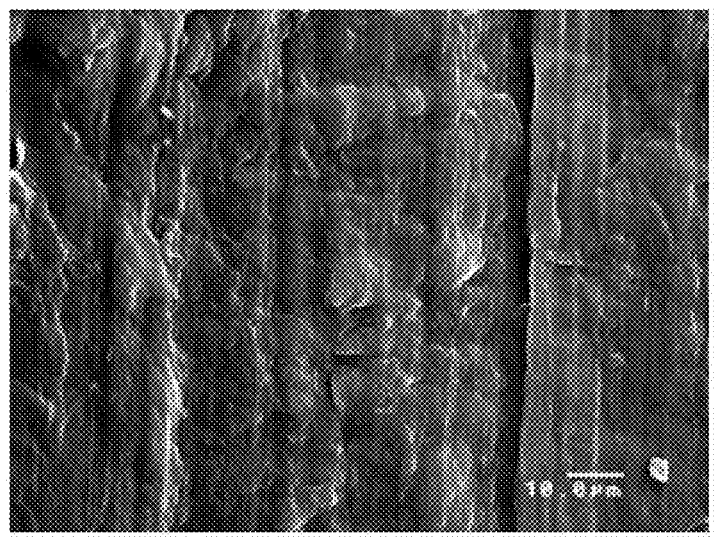
FIG. 7 is an image of a scanning election microscope of a polymer resin comprising an organic-inorganic nanocomposite obtained in Example 10.
Figure 8:
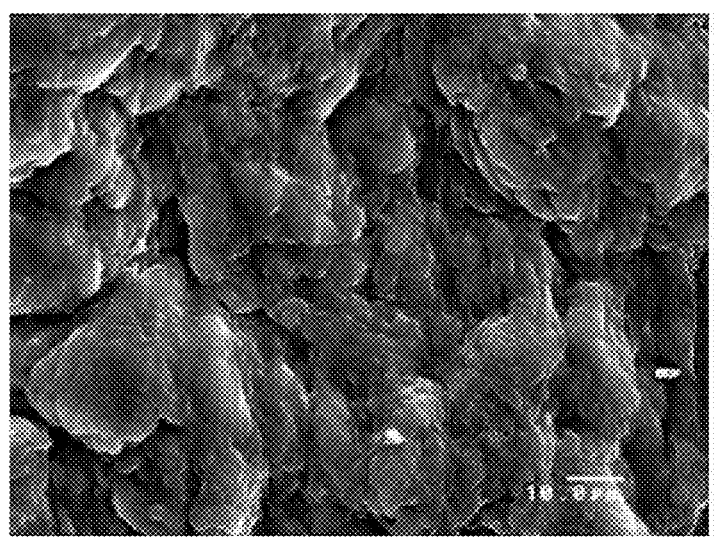
FIG. 8 is an image of a scanning election microscope of a polymer resin comprising a conventional inorganic nanocomposite obtained in Comparative Example 2.

The polymer resins obtained in Example 10 and Comparative Example 2 were cut away, the cross sections thereof were observed using a scanning electron microscope (SEM), and images thereof were shown in FIGS. 7 and 8, respectively.

As shown in FIGS. 7 and 8, it was confirmed that the polymer resin comprising the organic-inorganic nanocomposite according to the present invention had higher compactness than the polymer resin comprising the conventional inorganic nanoparticle.

Accordingly, it can be estimated that the polymer resin comprising the organic-inorganic nanocomposite according to the present invention has better mechanical properties such as strength, flame resistance and the like.

What is claimed is:
1. An organic-inorganic nanocomposite, comprising:
   inorganic nanoparticles each having one or more hydrogen bondable functional groups;
   first organic compounds each having two or more hydrogen bondable functional groups and one or more aromatic groups; and
   second organic compounds each having one or more hydrogen bondable functional groups and one or more aromatic groups,
   wherein the inorganic nanoparticle, the first organic compound and the second organic compound are bonded sequentially through hydrogen bonds, and the hydrogen-bonded inorganic nanoparticle, first organic compound and second organic compound are laminated through π-π interaction to have orientation,
   wherein the inorganic nanoarticle is needle-shaped titania (TiO$_2$).
2. The organic-inorganic nanocomposite according to claim 1, wherein in the hydrogen bondable functional groups of the compounds and/or nanoparticle to be hydrogen-bonded, when one hydrogen bondable functional group is a proton donor, another hydrogen bondable functional group is a proton acceptor.

3. The organic-inorganic nanocomposite according to claim 2, wherein the proton acceptor is an atom selected from the group consisting of nitrogen, oxygen, sulfur, fluorine and chlorine, and the proton donor is a functional group selected from the group consisting of an amino group, a hydroxyl group, a carboxyl group, a thiol group, a hydrofluoric group and a hydrochloric group.

4. The organic-inorganic nanocomposite according to claim 1, wherein the inorganic nanoparticle has a particle diameter of 10 nm to 1 μm.

5. The organic-inorganic nanocomposite according to claim 1, wherein the first organic compound is a compound having two or more heteroaromatic groups comprising one or more selected from the group consisting of nitrogen, oxygen and sulfur.

6. The organic-inorganic nanocomposite according to claim 1, wherein the first organic compound is a compound having two or more heteroaromatic groups selected from the group consisting of pyrrole, pyridine, azepine, furan, pyran, osepine, thiophene, thiopyran and thiepine.

7. The organic-inorganic nanocomposite according to claim 1, wherein the second organic compound is an aromatic compound having an amino group, a hydroxyl group or a carboxyl group.

8. The organic-inorganic nanocomposite according to claim 1, wherein the second organic compound is a benzoic acid substituted with an alkyl group or an alkoxy group.

9. An organic-inorganic nanocomposite, comprising:
  inorganic nanoparticles each having one or more hydrogen bondable functional groups;
  first organic compounds each having two or more hydrogen bondable functional groups and one or more aromatic groups; and
  second organic compounds each having one or more hydrogen bondable functional groups and one or more aromatic groups,
  wherein the inorganic nanoparticle, the first organic compound and the second organic compound are bonded sequentially through hydrogen bonds, and the hydrogen-bonded inorganic nanoparticle, first organic compound and second organic compound are laminated through π-π interaction to have orientation,
  the inorganic nanoparticle is titania (TiO2),
  the first organic compound is 1,2-di(4-pyridyl)ethylene (DPE) of the following Formula (I), and
  the second organic compound is 4-hexyl benzoic acid (HBA) of the following Formula (II):

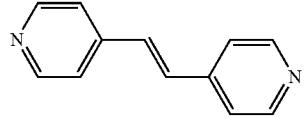

Formula (I)

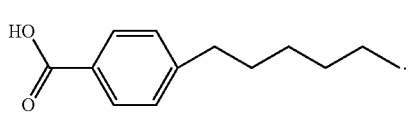

Formula (II)

10. A polymer resin comprising the organic-inorganic nanocomposite according to claim 1.

11. The polymer resin according to claim 10, wherein the polymer resin is a thermoplastic resin or a thermosetting resin.

12. The polymer resin according to claim 10, wherein the polymer resin is one or more selected from the group consisting of a polyvinyl chloride resin, a polystyrene resin, a polyethylene resin, a polypropylene resin, an acryl resin and nylon.

13. The polymer resin according to claim 10, wherein the polymer resin is one or more selected from the group consisting of a phenol resin, a urea resin, a melamine resin, an epoxy resin, unsaturated polyester, an alkyd resin and a urethane resin.

14. The polymer resin according to claim 10, wherein the organic-inorganic nanocomposite is used in an amount of 5 to 50 parts by weight based on 100 parts by weight of the polymer resin.

* * * * *